3,411,299
PEAK LOAD OPERATION IN STEAM
POWER PLANTS
Frederick Nettel, 173 Chapel Road,
Manhasset, N.Y. 11030
Filed Jan. 25, 1967, Ser. No. 611,749
7 Claims. (Cl. 60—67)

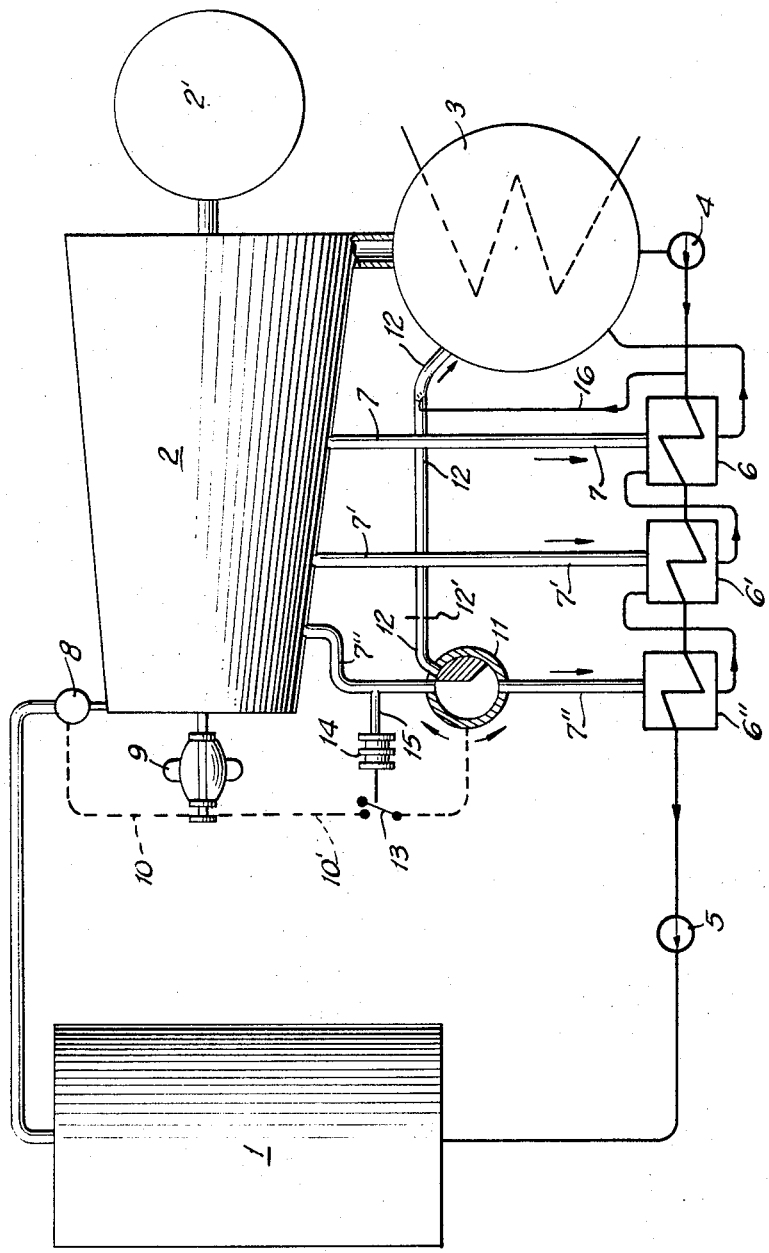

ABSTRACT OF THE DISCLOSURE

Steam power plant comprising a boiler, feeding a multistage turbine connected to heaters for regeneratively preheating feedwater, two governors, the first acting only at outputs up to the rated as known, the second operative only at outputs from rated up to a peak output, controlling output automatically by decreasing extraction for required output increases and by increasing extraction for ouptut decreases with said increase in extraction steam led from an extraction stage directly into the condenser, enabling the plant to furnish sudden peak outputs instantaneously and without substantial increase in boiler output above the rated.

---

My invention is applicable to one or more plants, each comprising a steam producer and a turbine, utilizing regenerative feedwater heating in which steam is extracted at one or more intermediate pressure turbine stages and condensed in feedwater heater or heaters to heat the turbine condensate on its way back to the steam producer.

For the purposes of this specification the term "steam producer" includes steam boilers of any type burning fossil fuels of any kind, as well as nuclear reactors moderated or unmoderated, in particular also fast breeder reactors irrespective of cooling medium utilized.

Known means to enable turbines to operate at overloads include bypassing of the first (governor) turbine stage and/or provision of peaking power units such as Diesel- or gas turbine sets or very simple steam boiler-turbine sets in stand-by running condition.

Overload capacities of modern high-pressure boilers (mostly once-through boilers) is very limited which also limits the use of bypassing the governor stage. The other means are very expensive and inefficient. Their use was sometimes justified in the past when plant outputs were small by today's standards and the number of generators operating in parallel in one system (grid) limited. Today, with individual turbine outputs of 200 and more mw., and grid outputs 2000 mw. or more are common, peak performance must be measured in percent of grid output, preferably 10 to 15 percent, and to be practical, must involve only small additional investments.

It is the basic purpose of this invention to solve the problem of providing peak load operation in a novel and simple manner. How this and other and further objects are achieved will become clear from the following specification when taken together with the drawing forming part of it, and showing an embodiment of my invention by way of a simple schematic non-limiting example.

In the drawing a plant is shown with three feedwater heaters and a 3-way valve for regulating extraction above rated output. It is known to increase the output of extraction turbines by reducing steam extraction, but this feature cold not be used so far for regulating turbines which have to meet not only output increases but also decreases. No simple means were available to deal quickly and effectively with sudden output decreases, short of blowing steam off to the atmosphere, which is undesirable.

This invention solves the problem by retaining conventional output regulation by varying the steam quantity at turbine inlet up to a predetermined output, preferably the rated output, and by using output regulation by varying steam extraction only in the range above rated load up to the desired peak load. This is made practicable by increasing output by decreasing extraction, and output decreases by increasing extraction and by leading the extra extraction steam to the turbine condenser, or any other space of lower pressure. Since peak load operation generally takes place only during short time spans, the economical impact of the losses involved is of no economical significance. Of the greatest importance is the fact that such regulation above the rated load does not change the output of the steam producer from rated output up.

The practical effectiveness of output increases by reducing extraction can be easily proved. For example in a power block operating with steam of 2400 p.s.i. 1000° F., reheat at about 400 p.s.i. also to 1000° F., condenser vacuum 1½", one percent of output increase requires a fraction more than one percent reduction in extraction steam of reheat pressure. An output decrease requires a similar increase in extraction, preferably at the same pressure. Since steam from higher-pressure extraction points is generally still superheated, this invention specifies not only throttling to a substantially lower pressure, but also cooling this steam, preferably by turbine condensate, before it enters the condenser.

The specific means to realize this invention include valve means interposed in at least some of the pipes connecting the extraction points with the feedwater heaters and the condenser, respectively, so disposed as to selectively regulate, while the turbine operates at outputs above its rated output, the flow of extraction steam either into at least some of the feedwater heaters and/or into the condenser, for increasing or decreasing turbine practically instantaneously and without change in the steam quantity at turbine entrance. During turbine operation up to rated output the said valve means remain in fixed position. They are, however, connected to and operated by the turbine governor when the required output exceeds the rated (or an otherwise specified) turbine output.

Reverting now in more detail to the drawing which shows diagrammatically the simplest possible embodiment of my invention. In the drawing 1 is the steam producer, boiler or reactor, 2 the steam turbine, 2' the electric generator or other consumer of energy, 3 the condenser, 4 the condensate pump, 5 the boiler feed pump. Interposed in the pipe between the condensate pump and the boiler feed pump are feedwater heaters 6, 6' and 6", these heaters being fed with extraction steam from the turbine via the pipe 7. 8 is the valve controlling the steam volume at turbine entrance, 9 is the governor driven from the turbine shaft, 10 is the impulse line between 8 and 9 active during operation of the turbine between no-load and rated load, 11 is a valve in pipe 7" which controls steam flow into 6" and/or the condenser. Normally the connection to 6" is open and the pipe to the condenser 12 is closed.

At turbine outputs above the rated output, valve 11 is operated by the governor 9 via the impulse line 10'. At loads below the rated, the switch 13 is open, disconnecting the governor. The closing of line 10' is effected by the pressure below actuated by the tube 15 branched off from pipe 7" and connected to switch 13. The steam pressure in pipe 7" rises with the turbine output and attains a known value at rated load. This pressure acting on bellows 14 closes the switch so that the valve 11 can start operating as planned. Other data than this pressure may be used to connect the valve 11 to the governor. If required turbine output rises, its speed will tend to drop, causing the valve 11 to move in the direction to close the connection to 6". More steam will therefore flow through the lower pressure stages of the turbine, increasing its power and restoring the speed. If under comparable conditions required turbine output drops, the valve 11 moves in the opposite direction, opening gradually the connection pipe 12 to the condenser. More steam is extracted from the turbine; its output falls restoring the speed to normal. During turbine operation at or above rated output the valve 8 remains open. Since the steam flowing from valve 11 to the condenser has the same pressure as that in pipe 7″ it is advisable to interpose in the pipe 12 an orifice 12′ or other throttling device, to reduce its pressure substantially before it enters the condenser. Because extraction steam from higher-pressure extraction points is often superheated, this invention provides introducing a jet of condensate into steam flowing from valve 11 into the condenser via the pipe 16.

Obviously, the equipment needed to convert a power plant unit for cooperating in the peak power supply is simple and cheap; all units of a grid can participate, which in a grid of 2000 mw. amounts to an extra output of 200 to 300 mw. My invention is also applicable to mobile plants, including ship propulsion plants.

Having now described and illustrated an embodiment of my invention I wish it to be understood that my invention is not limited to the specific form and arrangement illustrated hereinbefore, nor to the specific form of my claims.

I claim:

1. In the method of peak output production and regulation in steam power plants comprising a steam producer, a multi-stage steam turbine in operational connection with said steam producer, said turbine equipped with steam extraction points at intermediate stages, said turbine having first governor means for regulating plant output between no-load and rated load by varying the steam flow between the steam producer and the turbine, disconnectable second governor means for regulating plant output in the range above rated output up to a predetermined peak output, multiple feedwater heaters connected to said extraction points for regenerative preheating the feedwater on its way back to said steam producer, a condenser in operational connection with said turbine, the steps, at outputs up to the rated output, to vary the steam flow at turbine inlet in response to impulses furnished by said first governor, however, at outputs above the rated output, to keep the steam flow at turbine inlet substantially unchanged corresponding to rated output, while varying automatically steam extraction from the turbine, decreasing it for required output-increases and increasing it for required output reductions, in response to impulses from said second governor means, so that plant output changes in the range above the rated output take place practically instantaneously and without substantial changes in the output of the steam producer.

2. In the method as set forth in claim 1, the step of leading the extra steam extracted from the turbine at outputs above the rated outputs into the condenser.

3. In the method as set forth in claim 2, the step of throttling the extra steam extracted from the turbine at outputs above the rated output to a lower pressure before it enters the condenser.

4. In the method as set forth in claim 2, the step of cooling the extra steam extracted from the turbine at outputs above the rated output before it enters the condenser.

5. In a steam power plant capable of producing and regulating peak outputs the combination comprising a steam producer, a multi-stage steam turbine in operational connection with said steam producer, said turbine being equipped with steam extraction points at intermediate stages, a steam condenser connected to said turbine, multiple feedwater heaters connected to said extraction points by first valved pipe means, for regeneratively preheating the feedwater on its way back to the steam producer, a first governor for regulating the turbine output in the range between no-load and a predetermined rated output by automatically varying the steam flow at the turbine inlet as known per se, a second disconnectable turbine governor operative only in the ouptut range from rated output up to a predetermined peak output, second valved pipe means connecting at least one of the extraction points with the condenser, means for maintaining the steam flow from the steam producer to the turbine at a substantially constant value corresponding to the said raetd output when the required output exceeds said rated output, means of making said second governor operative under these conditions only in such a manner that for a required output the flow through the first valved pipe means is automatically reduced and for a required output decrease the flow through said second valved pipe means to the condenser is automatically increased, so that even sudden required output changes up or down in the range between rated and peak outputs can be met practically instantaneously and without substantial changes in the output from the steam producer.

6. In a power plant as set forth in claim 5, orifice means interposed in said second valved pipe means for reducing the steam pressure therein before the steam enters the condenser.

7. In a power plant as set forth in claim 5, cooling means interposed in said second valved pipe means for lowering the temperature of the steam therein before the steam enters the condenser.

References Cited

UNITED STATES PATENTS

| | | | |
|---|---|---|---|
| 1,726,730 | 9/1929 | Backstrom et al. | |
| 1,983,275 | 12/1934 | Egloff | 60—105 |
| 2,106,346 | 1/1938 | Gleichmann | 60—106 |
| 3,289,408 | 12/1966 | Silvestri | 60—107 X |
| 3,314,237 | 4/1967 | Strohmeyer | 60—105 |

MARTIN P. SCHWADRON, *Primary Examiner.*

CARROLL B. DORITY, *Assistant Examiner.*